N. J. WYETH.
Ice Implement.
No. 3,317.
Patented Oct. 25, 1843.
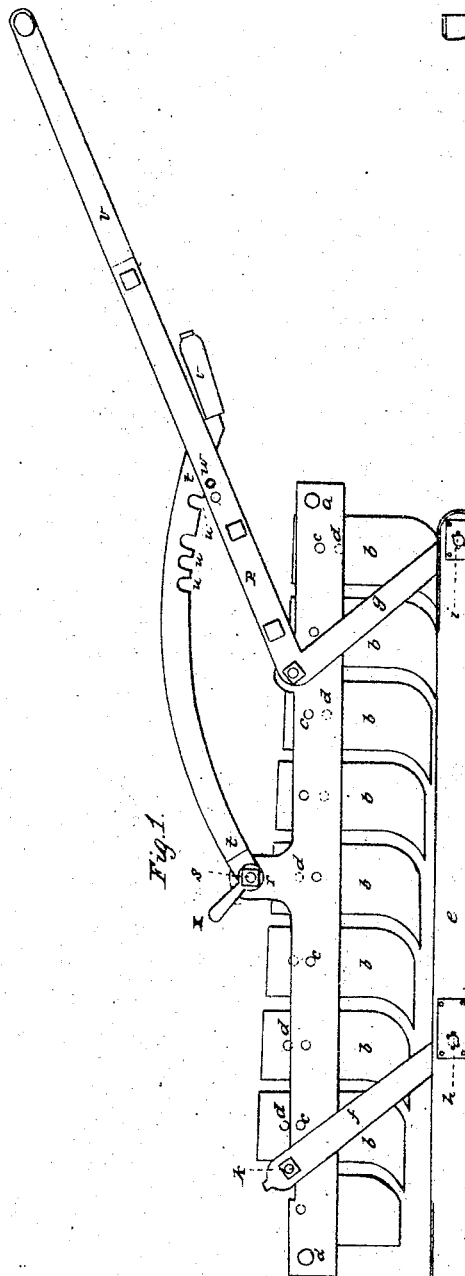
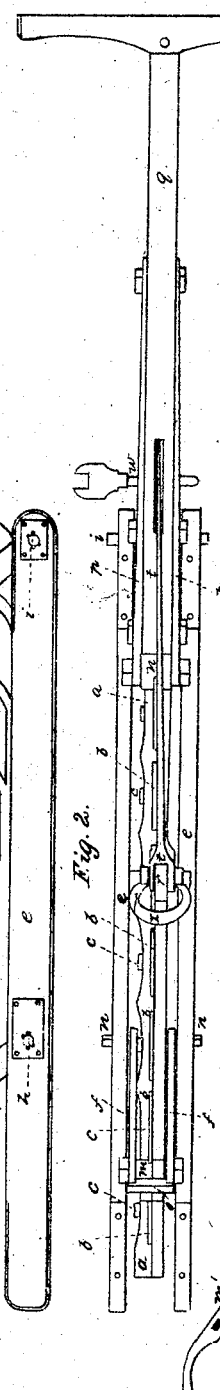
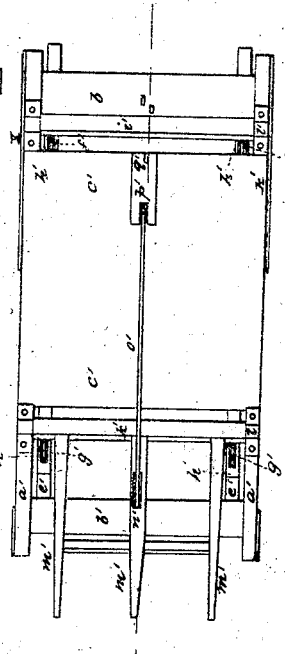
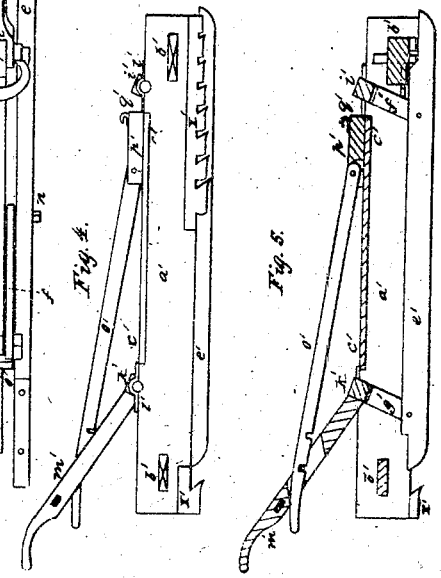

UNITED STATES PATENT OFFICE.

NATHANIEL J. WYETH, OF CAMBRIDGE, MASSACHUSETTS.

IMPROVEMENT IN ICE CUTTERS AND MARKERS.

Specification forming part of Letters Patent No. 3,317, dated October 25, 1843.

*To all whom it may concern:*

Be it known that I, NATHANIEL J. WYETH, of Cambridge, in the county of Middlesex and State of Massachusetts, have invented new and useful Improvements in Ice Cutters and Markers; and I do hereby declare that the following description, taken in connection with the accompanying drawings, hereinafter referred to, forms a full and exact specification of the same, wherein I have set forth the nature and principles of my said improvements, by which they may be distinguished from other inventions of a like class, together with such parts or combinations as I claim and wish to have secured to me by Letters Patent.

The figures of the accompanying plate of drawings represent my improvements.

Figure 1 is a side elevation of an ice-cutter, and Fig. 2 is a plan of the same, both figures showing the application of my improvements to the above-named apparatus. Fig. 3 is a plan of a "marker" or cutting-machine for marking out the shape of the blocks of ice on the surface of the ice in the pond prior to cutting the grooves with the cutter aforesaid, my improvements being applicable to this implement in substantially the same manner as to the cutter aforenamed. Fig. 4 is a side elevation of such a marker; and Fig. 5 is a longitudinal vertical section on the line A B, Fig. 3.

The main objects of my improvements are to raise the cutting teeth or chisels, whether of a cutter or marker, with facility from the groove, when desired, and enable them to be moved, turned round, and transported from place to place with dispatch; to change and regulate the position of the cutting-teeth, so as to cut grooves of different depths, and in making such change to move all the teeth equally, or to give them a parallel motion, so as to have the bottom of the furrow horizontal; to always preserve the perpendicularity of the chisels, and, furthermore, to enable one to use a tool or chisel, however sharp it may be, which, by the ordinary arrangement of the chisels, would cut too deep, or, in a technical phrase, would work "too rank." These results have heretofore been difficult of attainment; but by my improvements they are effectually secured, and the general protection of the chisels is much better secured than by any former arrangement.

$a\ a$, Figs. 1 and 2, are the back bar of an ice-cutter, which may be formed of two pieces of metal firmly riveted together, as shown in the drawings; or it may be in one piece with suitable slots for the insertion of the teeth or chisels $b\ b\ b$, &c., these chisels being fastened in said slots by means of the screws and nuts represented at $c\ c\ c$, Figs. 1 and 2. Each of the chisels $b\ b\ b$, after the front one, is arranged so that its bottom edge or face shall be a regular distance lower than that of the one which precedes it in the ordinary way, and by varying the position of the holes in the back bar, through which the fastening-screws $c\ c$ pass, and forming two holes or a secondary hole, $d\ d\ d$, in each of the chisels $b\ b\ b$, as shown in Fig. 1, each chisel may be substituted for any other one in the series, (by using the upper or lower hole in the same,) and the bottom or lower edges still have the same relative position. The back bar, $a\ a$, is connected to the bearing-runners $e\ e$, Figs. 1 and 2, by the diagonal turning arms or lever-bars $f\ f\ g\ g$, the former being near the front and the latter near the rear of the apparatus, said bars being arranged and operating substantially similar to those which connect the two parts of a common parallel-ruler. The bearing-runners $e\ e$ are shaped as seen in Fig. 1 and ironed or otherwise properly fixed so as to slide over the surface of the ice, being arranged at sufficient distance apart to permit the free rise and descent of the cutting-chisels between the same, and also to allow a free escape to the chips of ice made by the cutters. The lever-bars $f\ f$ and $g\ g$ are arranged one on each side of the back bar and are connected at their lower ends to the short shafts or turning pins $h\ h$ and $i$, so as to turn with said shafts or pins. These shafts or pins rest and turn in proper bearings in the runners $e\ e$, as shown in the drawings, the rear shaft, $i$, extending entirely across the space between said runners, so as to brace the same or strengthen their connection, while the shafts $h\ h$, &c., only pass through one runner, so as to permit the movement of the chisels, as before specified. The lever-bars are also similarly connected at their tops (so as to turn) to the turning shafts or pins $k\ l$, Fig. 1, which rest and turn in proper bearings on the top of the back bar, $a\ a$, as shown at $m\ n$, Figs. 1 and 2. The front lever-bars, $f\ f$, are connected together over the top of the back bar by means of the cross bar or piece o, while the rear bars, g g, are not so connected, but have arms p p, Fig. 2, extending at an acute angle from their tops, as shown in Fig. 1, which arms are firmly fastened to the guiding-handle q, Figs. 1 and 2, by moving which handle up and down the back bar and cutters may be raised or depressed.

The above description embraces or covers that part of the apparatus which has for its object the raising or depressing of the chisels with the back bar, and it will be seen that it accomplishes the desired effect with great facility, moving every chisel an equal distance and serving always to preserve the perpendicularity of the chisels and to make every position in which the cutting apparatus can be arranged parallel to every other one.

The machinery for confining the back bar and chisels in any desired position is as follows: Toward the center of the top of the back bar there is an upright projection, r, shaped as seen in Fig. 1. A cross shaft or pin, s, rests and turns freely in a proper hole in this projection, which pin also passes through suitable holes in the forked end of the arched rack-bar t t, Figs. 1 and 2, the fork of which straddles the projection r. The other end of the rack-bar passes through a proper slot in the guiding-handle q, and has proper notches u u and a handle at v, by which it may be thrown into or out of connection with the screw-confining pin w, which engages with the notches u u, and which may be placed in either of the two holes made through the handle (and shown in Fig. 1) as occasion may require.

By the above described arrangement of the rack-bar and parts to which it is connected it will readily be seen that the back bar with the chisels may be confined in any desired position. The shackle x, to which the draft or motive power is to be attached, is connected to the shaft s in the projection r in the manner shown in Figs. 1 and 2 or in any other proper manner.

The application (before suggested) of the above-specified apparatus for raising and lowering the cutters to the machine for marking out the blocks of ice is as follows, Figs. 3, 4, 5 representing the same, as above mentioned:

The frame-work of the markers consists of two longitudinal joists, a' a', Figs. 3, 4, 5, arranged edgewise and tied or connected together by the front and rear cross-beams or bars b' b', and having a platform, c' c', firmly fastened to the tops of the planks a' a'. The cutting-teeth x' x' are connected to the exterior sides of the planks a' a', as shown in the figures.

The bearing-runners e' e' are placed between the planks a' a', as shown in Fig. 3, the diagonal arms f' f' g' g' having their lower ends arranged in slots h' h', &c., in the runners and turning on proper pins passed through the same. The upper ends of the arms f' f', g' g' are connected, respectively, to the square turning shafts i' k', Fig. 3, the journals of which have bearings at l' l' l' l' on the top of the planks a' a'. The handles m' m' m', by which the marker is guided, are connected to the rear shaft k', the center one having a proper slot, n', Fig. 3, through which one end of the rack-bar o' passes, and a confining-pin with which the notches in said rack-bar engage and confine the cutters in any desired position.

The front end of the rack-bar is connected so as to turn easily to the stationary block p', as shown in Fig. 3, said block being firmly fastened to the platform c' c', and having the shackle q' secured to it.

It will be apparent in both the above-described machines that when the diagonal arms or lever-bars f f g g or f' f' g' g' are brought more or less near to a vertical position the cutting chisels or teeth will be correspondingly raised and depressed, and the movement of the said parts will always be parallel to the surface of the ice.

Having thus described my improvements, I shall claim as my invention—

1. The use or combination of bearing-runners with the back bar or planks to which the cutters or chisels are fastened, (however the said parts may be connected,) by which combination a cutter or marker may be moved about from place to place with facility.

2. The connecting the said runners with the back bar or parts to which the cutters are attached by means of the turning lever-bars, arranged as hereinbefore specified, which arrangement permits the cutters to be moved up and down between the runners at pleasure and serves peculiarly to preserve the perpendicularity of the cutters and also to move all parts of the cutting apparatus equally.

3. The combination of a rack-bar (straight or arched) with the movable guiding-handles and confining-pin passing through the same, and with the back bar aforesaid for the purpose of confining the cutting apparatus in any desired position, the whole arrangement operating, substantially as hereinbefore described, to produce the results hereinabove set forth.

In testimony that the foregoing is a true description of my said invention and improvements I have hereto set my signature this 9th day of October, in the year of our Lord 1843.

NATHL. J. WYETH.

Witnesses:
CHARLES F. SMITH,
EZRA LINCOLN, Jr.